Nov. 5, 1968   B. C. HAMLET   3,409,155
SELF-DISCHARGING BULK FEED VEHICLE
Filed July 22, 1966   2 Sheets-Sheet 1
FIG_1
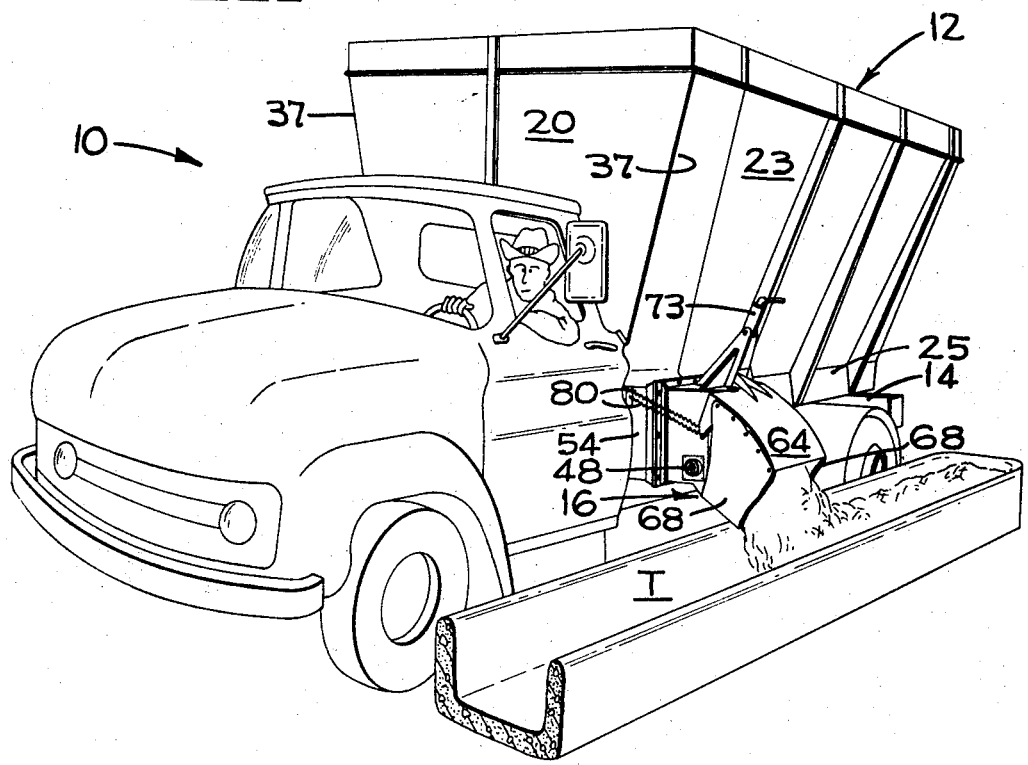
FIG_4
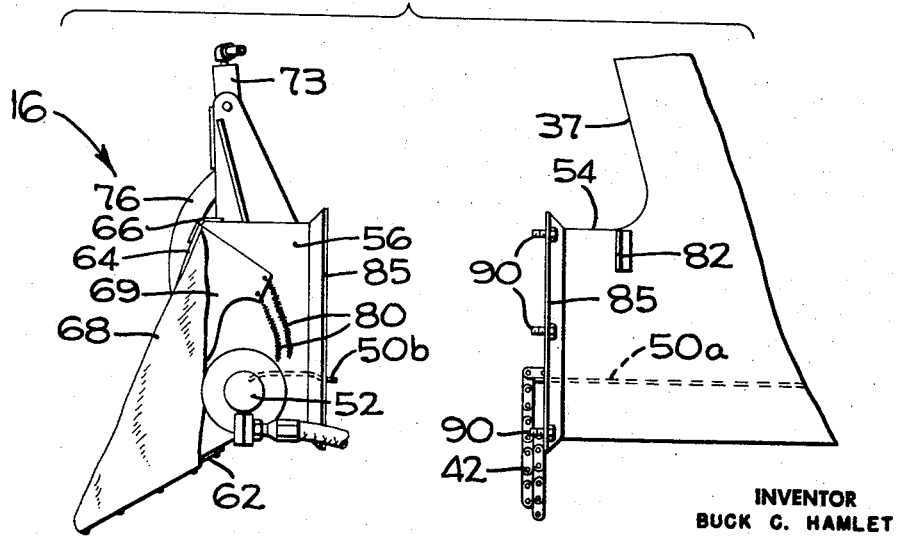
INVENTOR
BUCK C. HAMLET
BY Francis W. Anderson
ATTORNEY Nov. 5, 1968   B. C. HAMLET   3,409,155
SELF-DISCHARGING BULK FEED VEHICLE
Filed July 22, 1966   2 Sheets-Sheet 2
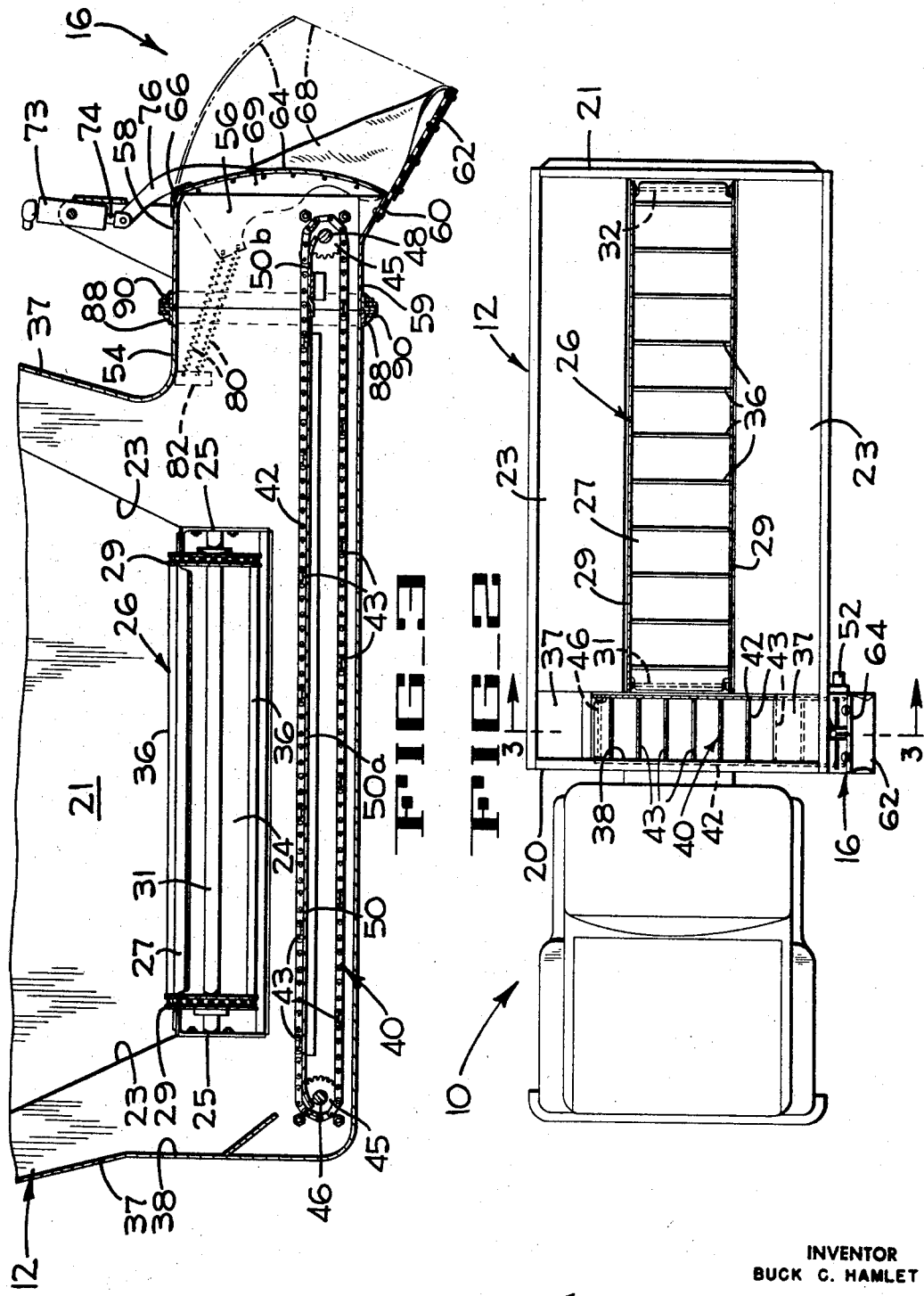
INVENTOR
BUCK C. HAMLET
BY Francis W. Anderson
ATTORNEY United States Patent Office 3,409,155
Patented Nov. 5, 1968

3,409,155
SELF-DISCHARGING BULK FEED VEHICLE
Buck C. Hamlet, Brea, Calif., assignor to FMC Corporation, San Jose, Calif., a corporation of Delaware
Filed July 22, 1966, Ser. No. 567,233
3 Claims. (Cl. 214—519)

ABSTRACT OF THE DISCLOSURE

An open-topped vehicle with inwardly inclined side sections for carrying bulk feed for cattle and for distributing the same along a cattle feed trough. The vehicle includes a centrally located, longitudinally extending first drag conveyor for moving the feed forwardly and a second drag conveyor positioned transversely of the vehicle body at the forward end thereof for receiving the material from the first conveyor and transporting it into a delivery chute extending outwardly from the vehicle body. The chute is removable along with an outer portion of the second conveyor when the vehicle is to be transported over the public highways.

---

The present invention pertains to self-discharging bulk feed vehicles, and more particularly to vehicles designed for transporting cattle feed, or the like, and for automatically distributing such material through a laterally projecting discharge chute into a feed trough.

The distribution of bulk feed to cattle troughs is generally accomplished by vehicles which are designed to discharge the feed laterally as the vehicle is driven past the troughs that align the cattle pens. In the cattle feeding industry it is of considerable importance to correctly prescribe and regulate the amount of feed for each animal, and, therefore, the amount of feed delivered to each trough section servicing a predetermined number of animals must be carefully controlled. Normally, the body of the vehicle which contains the feed material is mounted upon a scale mechanism and the exact weight of feed distributed to the troughs is readily determined by the driver of the vehicle as it is discharged.

It will be appreciated that the carefully controlled discharge of predetermined amounts of feed is an essential characteristic of vehicles of the type described and that the mechanisms utilized to propel the feed material from the vehicle must be smooth in operation and readily responsive to control by the operator of the vehicle. Furthermore, the structural arrangement of the discharging mechanisms must be such that the driver can maintain control of both the vehicle and the manner of distributing the feed at all times.

In order to solve the foregoing problems inherent in the discharge of bulk feed material, the apparatus of the present invention includes a pair of separate conveyors operating at the bottom of the vehicle tank body structure to move the feed first forwardly and then laterally. The conveyor for propelling the feed laterally lies at one end of the body and projects within a laterally extending chute that is adapted to be positioned over the feed trough when the vehicle is discharging. Since applicable state laws often limit the over-all width of vehicles which may be transported over the public highways, the discharge chute of the present invention is provided with a special feature which allows it to be readily dismantled when the vehicle is transported from one location to another.

It is an object of the present invention to provide a self-discharging bulk feed vehicle which will discharge the loose feed material in a uniform and carefully controlled manner so that an accurate determination of the amount of discharged material can be continuously ascertained.

Another object of the present invention is to provide a laterally discharging bulk feed vehicle which may be readily controlled by a driver without considerable skill or experience.

A still further object of the present invention is to provide a laterally discharging bulk feed vehicle which may be readily adjusted for travel wherein over-all vehicle width is a primary concern.

These and other objects and advantages of the present invention will become more apparent from the following description and the accompanying drawings, in which:

FIGURE 1 is a perspective showing the vehicle of the present invention and illustrating its manner of operation.

FIGURE 2 is a plan of the vehicle shown in FIGURE 1.

FIGURE 3 is an enlarged partial section of the body of the vehicle taken along the lines 3—3 of FIGURE 2.

FIGURE 4 is a detail showing the discharge chute disconnected from the main body of the vehicle.

Referring now more particularly to the drawings, FIGURE 1 shows a vehicle 10 adapted to carry bulk feed material or the like within an open-topped tank body structure 12. The body is adapted to rest upon a scale mechanism (not shown) located on the frame 14 of the vehicle. A discharge chute 16 is connected to the lower forward end of the body 12 on the driver's side of the vehicle to permit the feed from the vehicle to be discharged into a feed trough T. In operating the vehicle, the driver will steer in a parallel course to the trough and allow the discharging chute 16 to project over the trough. The chute must project laterally to a great enough extent that the tires are adequately spaced from the trough during discharge to prevent damage thereto.

The body structure 12 of the vehicle includes a vertical front wall 20, a vertical rear wall 21 (FIG. 3), and side walls 23 which slope inwardly from top to bottom. At the bottom of the body is a well 24 (FIG. 3) which is formed by short vertical side plates 25 welded to the lower ends of the sloping sides 23 of the body. The well 24 houses a drag conveyor 26 which runs almost the entire length of the body and, in combination with the wedge shape defined by the sloping side walls 23, serves to move the bulk feed material forwardly. Conveyor 26 includes a flat bed plate 27 affixed across the upper end of the well to form a floor over which the material within the body may be moved. A pair of parallel chains 29 are mounted upon a drive shaft 31 at the forward end of the vehicle and an idler shaft 32 at the rearward end of the vehicle for movement at the lateral edges of the bed plate. Both of the shafts 31 and 32 are rotatably supported by the vertical walls 25 at the lower end of the body structure with the drive shaft 31 being arranged to be driven by an hydraulic motor mounted on the exterior of the vehicle (not shown). A series of spaced channel members 36 are rigidly attached at their ends to the chains 29 and are arranged to ride over the upper surface of the bed plate 27 to urge the feed material within the body forwardly during operation of the conveyor.

The forward end of the body 12 includes a pair of opposed, sloping side walls 37 which are seen to slope at a steeper angle than the side walls 23 and thereby define an expansion chamber 38 wider in overall configuration than the major portion of the body. This expansion chamber discourages clogging of the material as it is moved forward by the drag conveyor 26 since it exposes the feed material to a larger cross sectional area when it reaches the discharge end of the vehicle.

At the bottom of the expansion chamber 38 is a cross-feed or transverse conveyor 40 spaced below the drag conveyor 26 for receiving the bulk feed material therefrom and moving it laterally thereto and out the discharge chute 16. Conveyor 40 includes a pair of spaced, endless chains 42 which are connected by a plurality of spaced channel members 43 and are trained upon sprockets 45 fixed to an idler shaft 46 at the lower corner of the expansion chamber 38 and to a drive shaft 48 that is mounted upon the discharge chute 16. The upstanding channel members 43 which serve to propel the feed material out of the discharge chute are arranged to ride over a bed plate 50 which includes a long portion 50a mounted at the bottom of the expansion chamber and a relatively short portion 50b mounted within the discharge chute 16 and adapted to interlock with the portion 50a when the discharge chute is attached to the vehicle so as to form one smooth, continuous floor surface over which the channel members and the feed material may travel. The cross-feed conveyor 40 is driven by an hydraulic motor 52 (FIG. 4) mounted on the exterior of the discharge chute.

As best seen in FIGURES 3 and 4, the lower corner of the body 12 which is closest to the driver's position includes an outwardly extending, rectangularly shaped projecting portion 54 to which the discharge chute 16 is attached. The discharge chute is rectangularly shaped to match the projecting portion 54 and includes a pair of flat side panels 56, an upper panel 58, and a lower panel 59 which is deflected at its outer edge to provide a downturned flange 60. Attached to the flange 60 and extending outwardly therefrom is a flat lip member 62 which is preferably formed of a flexible material, such as rubber, so as to protect the animals which may be feeding in the trough or other receptacle into which the feed material is discharged. The outer end of the chute is closed by an arcuate hatch cover 64 which is hingedly mounted at 66 to the outermost edge of the upper panel 58 of the chute. A pair of canvas flap members are provided to form the projected sides of the chute when it is in its open position, as shown in FIGURE 1 and in phantom lines in FIGURE 3. The canvas flaps 68 are riveted to the sides of the projecting lip member 62 and to downturned portions 69 of the hatch cover. When the hatch cover is in the closed position to block the chute 16, the lower edge of the cover is in sealing relationship with the leading edge of the downturned flange 60 and the canvas side flaps fold down on the lip member 62, as shown in FIGURE 3.

During operation of the cross-feed conveyor 40 the hatch cover 64 is automatically opened to allow the feed to be discharged therefrom. This is accomplished by means of an air cylinder 73 and a piston rod 74 which is connected to the upper end of a lever 76 that is attached to the face of the hatch cover. The pressurizing of the air cylinder 73 (by conventional means, not shown) automatically upon starting the cross-feed conveyor 40, acts to pivot the upper end of the lever 76 about the hinge 66 to raise the hatch cover to its open position. When the cross-feed conveyor 40 is stopped, air pressure is automatically removed from the cylinder 73 and the hatch cover is brought back to its closed position by means of tension springs 80 which are attached to the downturned portions 69 of the hatch cover and to a pair of flanges 82 on the projecting portion 54 of the body 12.

The discharge chute 16 is mounted to the body structure of the vehicle by means of opposed, vertical mounting angles 85 welded to the projecting portion 54 of the body and to the side panels 56 of the discharge chute and by opposed, horizontal mounting angles 88 welded to the projecting portion 54 and to the upper and lower panels 58 and 59 of the discharge chute. The abutting angles 85 and 88 are releasably connected together by means of a plurality of spaced bolts 90 positioned at suitable intervals about the periphery of the chute.

During operation of the bulk feed vehicle 10, feed within the body 12 is propelled forwardly by the drag conveyor 26 over the bed plate 27 and is discharged onto the cross feed 40 which then propels it out the discharge chute 16. Since the body 12 is mounted upon scales which are read by the driver during the discharge of the feed, the amount of material fed to the trough T is continuously determined as it is discharged past the open hatch cover 64. When the predetermined correct weight of feed has been discharged, the feeding conveyors 26 and 40 are stopped, air cylinder 73 discharges, and the tension springs 80 immediately snap the hatch cover to its closed position in which it abuts against the downturned flange 60 of the discharge chute and blocks the egress of further material.

As can be readily determined from FIGURE 2, the discharge chute 16 projects laterally considerably past the overall dimensions of the tank body structure 12 so that it may be positioned over the trough T or a similar receptacle by the operator of the vehicle. This widening of the overall vehicle width past the dimensions of the tank body, while necessary in cattle feed lot operations, is quite often found to present problems when the vehicle is transported over the public highways in view of applicable state laws and local ordinances. It will be seen that the present invention provides a means for readily removing the discharge chute 16 from the rest of the vehicle structure and for quickly replacing it when the vehicle is ready for operation. When the discharge chute is to be removed, such as during transportation over highways, the bolts 90 are removed from the mounting angles 85 and 88 and the chains 42 of the cross-feed conveyor 40 are removed from the sprockets 45 on the drive shaft 48 as by dismantling a master link, for example. The tension springs 80 and the flexible connections to the drive motor 52 and air cylinder 73 are disconnected, and the forward portion 50b of the bed plate 50 is then pulled directly away from the rearward portion 50a to remove the discharge chute from the body of the vehicle. The reverse procedure is used in remounting the discharge chute by attaching the chains 42 to the sprockets 45 on drive shaft 48, connecting the tension springs 80, replacing the fittings to the air cylinder 73 and the drive motor 52, and securing the bolts 90 to the mounting angles 85 and 88.

From the foregoing, it can be seen that the present invention provides a self-discharging bulk feed vehicle in which the feed is propelled out of the vehicle by means of a pair of controlled conveyor systems. The discharge chute is automatically operated in conjunction with the conveyors so that the feed material leaving the vehicle is carefully controlled and limited. Furthermore, the discharge chute is provided with means for its ready dismantlement and reassembly when such procedures prove to be necessary.

The invention having thus been described, what is believed to be new and desired to be protected by Letters Patent is:

1. A self-discharging buk feed vehicle comprising an open-topped tank body structure having inwardly sloping side walls, first conveyor means extending longitudinally of said body structure at the bottom thereof, second conveyor means extending transversely at one end of said body structure and at the bottom thereof, said second conveyor means being spaced below said first conveyor means for receiving loose feed material therefrom, a discharge chute extending laterally from said body structure and including means for supporting a portion of said second conveyor structure, a hatch cover at the outer end of said chute operable in conjunction with said second conveyor means to allow said material to be discharged from said vehicle, and means removably mounting said chute to said body structure, said second conveyor means comprising a flat bed plate and a plurality of spaced, chain-driven, upstanding members arranged to ride over the upper surface of said bed plate to propel said material from the vehicle, said bed plate being comprised of two sections mounted within the body structure and the discharge chute, respectively, which sections are arranged to be removably interconnected to form a smooth, continuous upper surface throughout the length of said second conveyor means.

2. A self-discharging bulk feed vehicle comprising an open-topped tank body structure having inwardly sloping side walls, first conveyor means extending longitudinally of said body structure at the bottom thereof, second conveyor means extending transversely at one end of said body structure and at the bottom thereof, said second conveyor means being spaced below said first conveyor means for receiving loose feed material therefrom, a discharge chute extending laterally from said body structure and including means for supporting a portion of said second conveyor structure, and means removably mounting said chute to said body structure, said second conveyor means comprising a flat bed plate and a plurality of spaced, chain-driven, upstanding members arranged to ride over the upper surface of said bed plate to propel said material from the vehicle, said bed plate being comprised of two sections mounted within the body structure and the discharge chute, respectively, which sections are arranged to be removably interconnected to form a smooth, continuous upper surface throughout the length of said second conveyor means.

3. A self-discharging bulk feed vehicle as set forth in claim 1 including an air cylinder for opening said hatch cover, said air cylinder being actuated only during operation of said second conveyor means, and spring means for closing said hatch cover upon deactuation of said air cylinder.

References Cited

UNITED STATES PATENTS

| | | | |
|---|---|---|---|
| 2,869,726 | 1/1959 | Hertrich | 49—340 X |
| 3,037,780 | 6/1962 | Skromme et al. | 214—519 X |
| 3,047,173 | 7/1962 | Raney | 214—519 |
| 3,063,723 | 11/1962 | Toft | 214—519 X |
| 3,081,937 | 3/1963 | Kreider | 49—265 X |
| 3,273,734 | 9/1966 | Schuler | 214—521 |
| 3,286,862 | 11/1966 | Hansen | 214—519 |

ALBERT J. MAKAY, *Primary Examiner.*